United States Patent [19]

DeBruyne

[11] 4,252,034
[45] Feb. 24, 1981

[54] FREE-FLOATING PLANETARY TRANSMISSION WITH REVERSIBLE OUTPUT

[75] Inventor: Neil A. DeBruyne, Little Falls, N.J.

[73] Assignee: Curtiss-Wright Corporation, Wood-Ridge, N.J.

[21] Appl. No.: 59,464

[22] Filed: Jul. 20, 1979

Related U.S. Application Data

[63] Continuation of Ser. No. 842,392, Oct. 17, 1977, abandoned.

[51] Int. Cl.³ .................... F16H 37/06; F16H 57/10
[52] U.S. Cl. .................................... 74/675; 74/674; 74/411.5; 74/705; 74/766; 74/DIG. 8
[58] Field of Search ............ 74/674, 675, 705, 720.5, 74/411.5, 766, DIG. 2, DIG. 8

[56] References Cited

U.S. PATENT DOCUMENTS

| 2,706,311 | 1/1955 | Bade | 74/674 |
|---|---|---|---|
| 3,109,324 | 11/1963 | Locher | 74/675 X |
| 3,137,182 | 6/1964 | Berchtold et al. | 74/720.5 |
| 3,188,884 | 6/1965 | Bancroft | 74/665 K |
| 3,214,999 | 11/1965 | Lapp | 74/675 |
| 3,307,426 | 3/1967 | Whitaker | 74/675 |
| 3,540,311 | 11/1970 | Chillson | 74/797 |
| 3,646,834 | 3/1972 | Davis | 74/674 |
| 3,748,927 | 7/1973 | Hertzog | 74/675 |
| 3,886,816 | 6/1975 | DeFeo | 74/764 |
| 4,132,131 | 1/1979 | DeBruyne | 74/675 |

FOREIGN PATENT DOCUMENTS

949075 2/1964 United Kingdom ................ 74/766

Primary Examiner—Leslie Braun
Attorney, Agent, or Firm—Arthur L. Frederick

[57] ABSTRACT

A planetary transmission having free-floating compound planetary gear elements in which two of the planet gears of each planetary element mesh with a pair of gears co-axial with the transmission axis. The transmission also includes selectively operable clutch and brake means for connecting either of said pair of coaxial gears to the transmission output while the other of said pair of gears is connected to a fixed structure thereby providing the transmission with a reversible output.

5 Claims, 3 Drawing Figures

FREE-FLOATING PLANETARY TRANSMISSION WITH REVERSIBLE OUTPUT

This application is a continuation application of patent application Ser. No. 842,392, filed Oct. 17, 1977, now abandoned.

BACKGROUND OF THE INVENTION

The invention relates to planetary transmissions of the type disclosed in U.S. Pat. No. 3,540,311 granted Nov. 11, 1970 to C. W. Chillson. This prior patent discloses a planetary transmission in which the planetary elements are not provided with the usual support bearings which constrain the planetary elements against radial and tilting movements. Instead, each of the planetary elements of the transmission include a plurality of axially-spaced gears which are so spaced along the spindle of its planetary element that the net turning moment exerted by the input, output and reaction forces tending to tilt said element out of its radial plane is substantially zero. By said "radial plane" of a planetary element is meant a plane including the transmission axis and the axis of said element. In addition, the transmission includes floating rings having rolling contact with the spindles of the planetary elements to constrain the planetary elements against the radial forces thereon. Such a transmission is herein called a free-floating planetary transmission.

As described in said prior patent, such free-floating planetary transmissions have numerous advantages including the provision of a high speed-ratio reduction at a substantial savings in weight over conventional planetary transmissions. Applicant's assignee has built and successfully operated free-floating planetary transmissions capable of transmitting as much as 750 horsepower.

In many transmission applications, for example in a transmission for driving the propeller of a marine vessel, it generally is desirable to provide a reversible output drive to the propeller. U.S. Pat. No. 3,886,816 granted on June 3, 1975 to DeFeo et al discloses a planetary marine transmission including means for providing the transmission with a reversible output. This prior patent, however, does not disclose a free-floating planetary transmission. Instead, in this prior patent the planet gears are journaled in support bearings on a planet carrier and the two directions of output rotation are obtained by braking either the planet carrier or a gear with which the planet gears are in mesh.

A free-floating planetary transmission has no carrier on which the planet gears are journaled in support bearings. Accordingly, it is not possible to provide a free-floating planetary transmission with a reversible output in a manner similar to that disclosed in the aforementioned DeFeo et al patent.

SUMMARY OF THE INVENTION

An object of the invention resides in the provision of a novel combination of a free-floating planetary transmission which includes clutch and brake means to provide the transmission with either forward or reverse drive.

A further object of the invention resides in the provision of a free-floating planetary transmission in which each planetary element includes a plurality of axially-spaced planet gears and in which the transmission includes clutch and brake means such that the two gears meshing respectively with two of the planet gears of each planetary element can be connected either to the transmission output shaft or can be secured to a fixed structure of function as a reaction gear for the planetary transmission. With this configuration no additional gearing is required to provide the free-floating planetary transmission with a reversible output and at the same time this is achieved without disturbing the balance of the forces on the free-floating planetary elements.

Other objects of the invention will become apparent upon reading the annexed detailed description in connection with the drawings.

DESCRIPTION OF PREFERRED EMBODIMENTS

Figure 1:
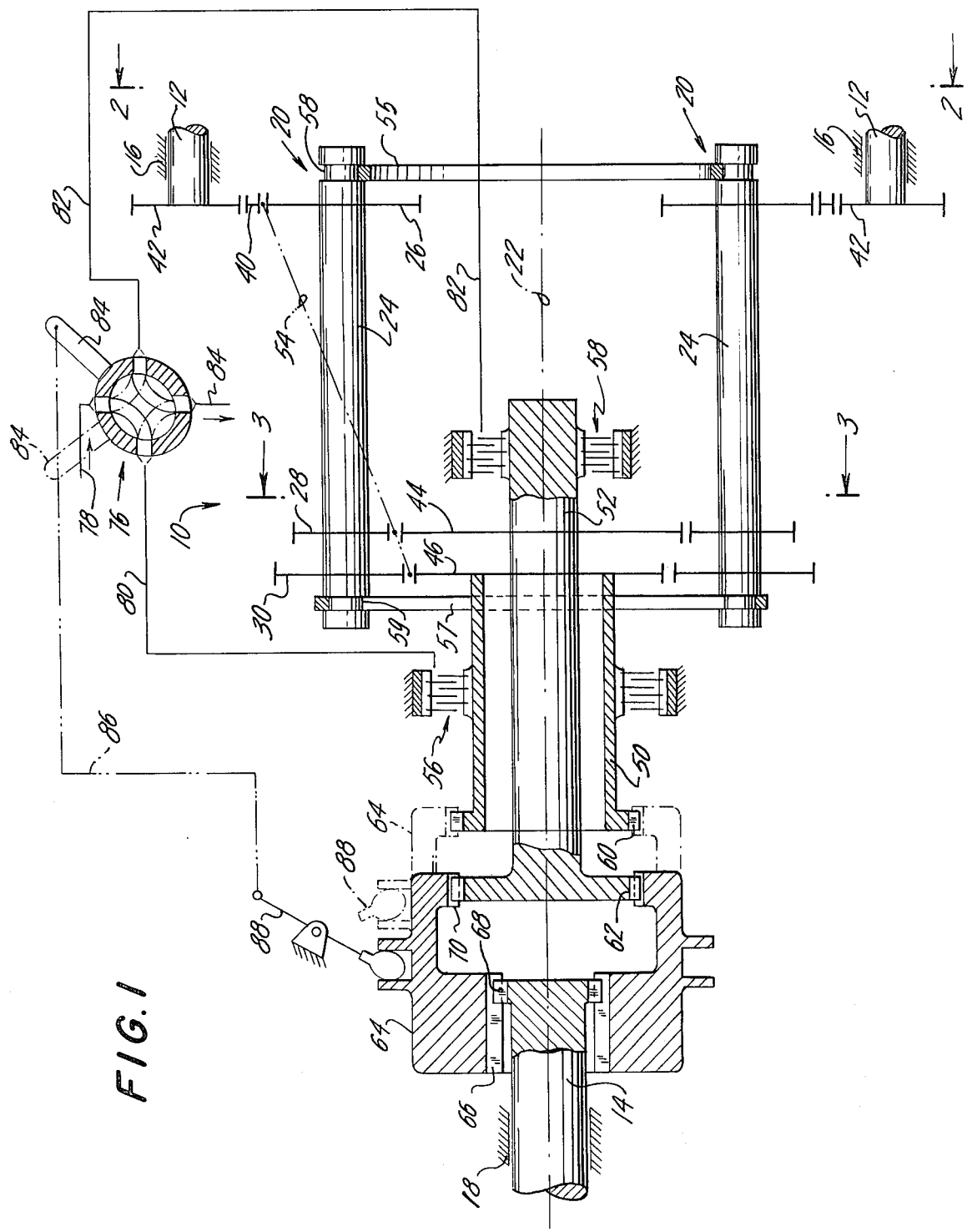
FIG. 1 is a schematic axial sectional view of a free-floating transmission embodying the invention.
Figure 3:
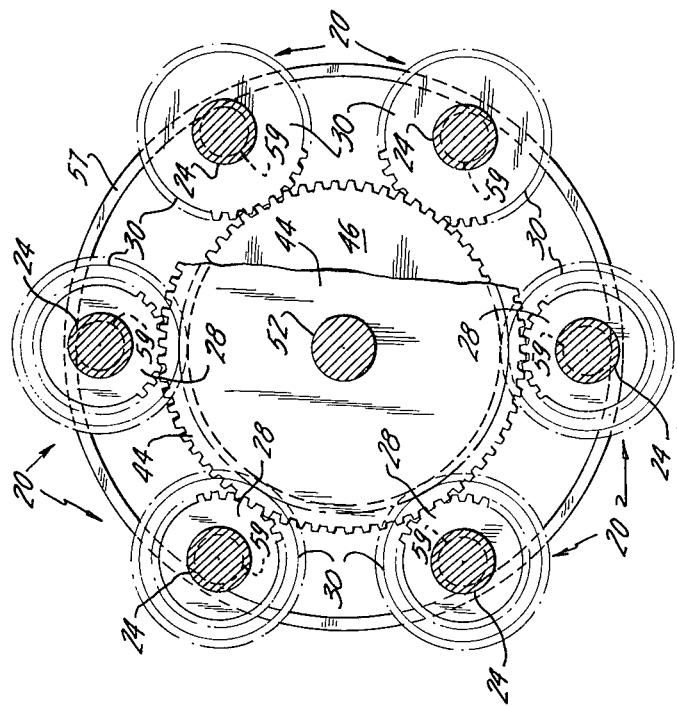
FIGS. 2 and 3 are sectional views taken along lines 2—2 and 3—3 of FIG. 1.
Figure 2:
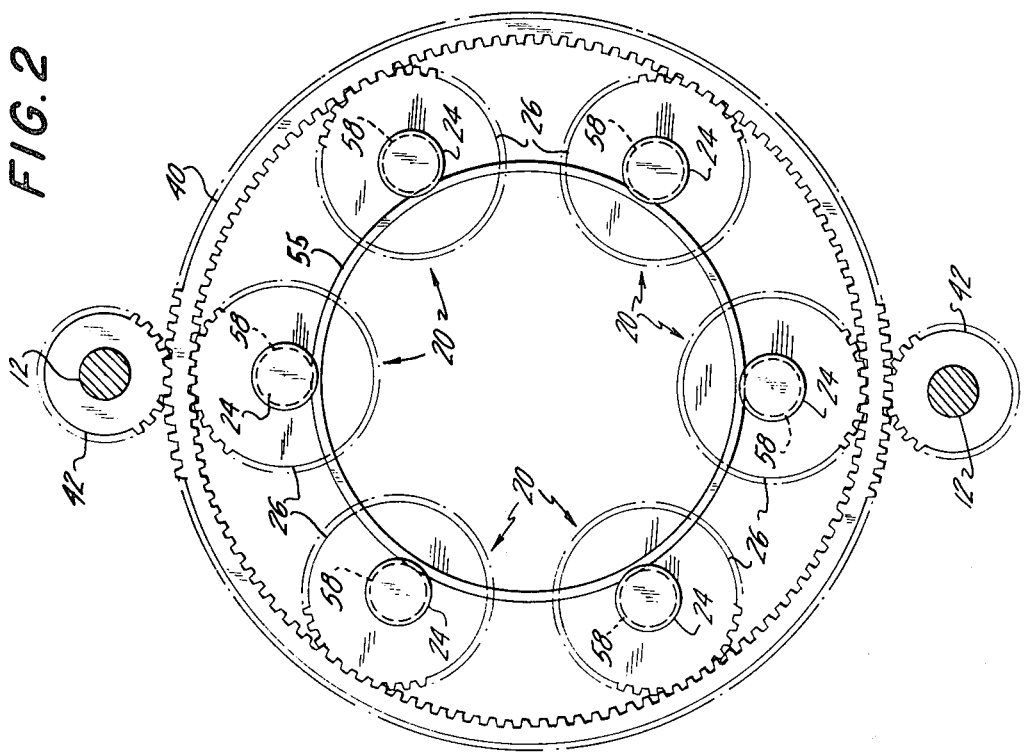

A free-floating planetary transmission 10 is shown for providing a reversible high-speed-ratio reduction from one or more input drive shafts 12 to an output shaft 14, said shafts being supported by fixed bearings 16 and 18 respectively.

The transmission 10 includes a plurality of planetary elements 20 circumferentially spaced about the axis 22 of the transmission 10. As illustrated, each planetary element 20 consists of a spindle 24 having three planet gears 26, 28 and 30, with each planet gear being secured to the spindle 24 against rotation relative to the spindle. The spindle 24 of each planetary element 20 is disposed parallel to the transmission axis and, therefore, the axis of each spindle 24 lies in a radial plane, that is, in a plane including the transmission axis.

The transmission input includes a floating annular gear or toothed wheel 40 disposed co-axial with the transmission axis and surrounding the planetary elements 20. The annular gear 40 has internal teeth disposed in meshing engagement with the teeth of the planet gears 26 of each planetary element 20. Also, the input shafts 12 are each provided with a gear or toothed wheel 42 having meshing engagement with the external teeth on the annular gear 40. With this arrangement and, for example, with two diametrically opposed input shafts 12, said shafts can be spaced apart laterally to a sufficient extent so that said shafts can be directly connected to individual power plants (not shown) disposed in side-by-side relation.

The planet gears 28 and 30 are disposed in mesh with toothed wheels 44 and 46 respectively, which are illustrated as sun gears co-axial with the transmission axis 22. The sun gear 44 is secured to a stub shaft 52 while the sun gear 46 is connected to a stub shaft 50.

A pair of brakes 56 and 58 are provided for the shafts 50 and 52 respectively such that, as hereinafter described, either of these shafts 50 and 52 may be locked against rotation to a fixed structure to function as a reaction gear for the planetary elements while the other of said shafts 50 and 52 is connected to the output shaft 14. The brakes 56 and 58 have been illustrated as conventional disc-type brakes engageable upon the application of hydraulic pressure. The aforementioned patent to DeFeo et al contains a more detailed description of such hydraulic brakes.

The planet gears 26, 28 and 30 of each planetary element 20 are spaced axially along the axis of their spindle 24 so that the center of their gear teeth meshing with the gears 40, 44 and 46 respectively, lie on a straight line indicated by the dash-two-dot line 54. As disclosed in said prior Chillson patent, with this straight line relationship, the axial spacing of the planet gears 26, 28 and 30 of each planetary element 20 is such that the turning moment exerted by the torque transmitting forces (input, output and reaction forces) tending to tilt said planetary element out of its radial plane is substantially zero. This is essential for successful operation of a free-floating planetary transmission. If not, the teeth of the planet gears would become subject to excessive stresses.

In order to restrain each planetary element 20 against the radial forces thereon so as to keep the axis of its spindle in position parallel to the transmission axis 22, a pair of floating rings 55 and 57 are provided. Each ring 56 and 57 is disposed in rolling contact with the spindle 24 of each planetary element 20 and in order to restrain each ring 55 and 57 against axial motion, each of these rings are received in annular grooves 58 and 59 respectively, formed in the spindles 24.

As illustrated, the ring 55 is in rolling contact with the radially inner sides of the spindles 24 and is disposed adjacent to the planet gears 26 and the ring 57 is in rolling contact with the radially outer sides of the spindles 24 and is disposed adjacent to the planet gears 28 and 30. With this arrangement, the floating ring 55 restrains radially inward motion of the planet gears 26 in response to the radial inward component of the forces on the meshing teeth of the planet gears 26 and the annular gear 40. Similarly, the floating ring 57 restrains radially outward motion of the planet gears 28 and 30 in response to the radial outward component of the forces on the teeth of the planet gears 28 and 30 meshing with the teeth of the sun gears 44 and 46, respectively. In addition, the floating ring 57 will restrain its end of the planetary elements 20 against radially outward movement in response to the centrifugal forces acting on these elements.

Obviously, additional floating rings could be provided if desired or needed to help provide radial restraint for the planetary elements 20. For example, if the centrifugal forces at the planet gear 26 end of the planetary element 40 were greater than the radially inward component of the forces on the meshing teeth of the planet gears 26 and the annular gear 40, then an additional floating ring (not shown) would be required having rolling contact with the radially outer sides of the spindles 24, like the ring 57, but at the planet gear 26 end of the spindles. Also, as described in connection with FIG. 1 of the aforementioned Chillson patent, suitable means preferably are provided for restraining said planetary elements against axial motion.

The stub shaft 50 is provided with splines 60 and the stub shaft 52 is provided with splines 62 of the same diameter but axially spaced from the splines 60. An axially-shiftable clutch member 64 has splines 66 disposed in meshing engagement with splines 68 on the output shaft 14 and also has splines 70 for selective engagement with either of the splines 60 or 62 on the shafts 50 and 52, respectively.

As illustrated, the axially-shiftable clutch member 64 is in its leftward (as viewed in FIG. 1) position with its splines 70 in engagement with the splines 62 of the shaft 52 and out of engagement with the splines 60 of the shaft 50. If now the brake 56 is engaged to lock the shaft 50 against rotation and the brake 58 is disengaged, then the sun gear 46 will function as the reaction gear for the planetary elements 20. Accordingly, driving torque can now be transmitted by said planetary elements 20 from their annular input gear 40 to the sun gear 44 which, through its shaft 52 and clutch member 64, is now connected to the output shaft 14 whereby the planetary elements 20 provide a high-speed-ratio reduction from the input gear 40 to the output shaft 14.

Similarly, if the clutch member 64 is shifted axially to the right to its dot-and-dash line position of FIG. 1, then its clutch teeth or splines 70 are in engagement with the splines 60 of the shaft 50 rather than with the splines 62 of the shaft 52. The clutch splines 66, however, remain in driving engagement with the splines 68 of the output shaft 14. Now, if the brake 58 rather than the brake 56 is engaged, then the sun gear 44 instead of the sun gear 46 will be locked against rotation to function as the reaction gear for the planetary elements 20 of the transmission. Accordingly, driving torque can now be transmitted by the planetary elements 20 to the output shaft 14 through the sun gear 46 to also provide a high-speed-ratio reduction from the input gear 40 to the output shaft 14 but now in the reverse direction because the planet gears 28 and 30 are of different size.

As is schematically illustrated, shifting of the clutch member 64 preferably is synchronized with engagement and disengagement of the hydraulically actuatable disc-type brakes 56 and 58. For this purpose, a two-position rotary valve 76 may be provided. In the position illustrated, the rotary valve 76 connects a source of hydraulic pressure 78 with a fluid line 80 leading to the brake 56 for engaging the brake to lock the sun gear 46 against rotation. At the same time, the rotary valve 76 connects the fluid line 82 leading to the brake 58 to a drain or vent 84 whereupon the brake 58 is disengaged. If the rotary valve 76 is rotated counterclockwise ninety degrees, from its position illustrated, to its dot-dash position, then the fluid line 80 for the brake 56 is vented and the brake 56 is disengaged while the fluid line 82 for the brake 58 is now connected to the source of hydraulic pressure 78 to engage the brake 58.

The operating lever 84 for the rotary valve 76 is schematically illustrated as having an operative connection 86 to an operating lever 88 for axially shifting the clutch member 64 such that when the rotary valve 76 is rotated to its dot-and-dash line position, the clutch member 64 is also shifted to its dot-and-dash line position.

When the sun gear 44 drives the output shaft 14, the speed of the output shaft 14, for a given input speed, is greater than when the sun gear 46 is driving the output shaft. In the case of application of the transmission 10 for driving the propeller of a marine vessel, the sun gear 44 preferably provides the drive for forward thrust and the sun gear 46 provides the drive for reverse thrust.

In shifting such a marine transmission from forward to reverse thrust or vice versa, the one or more input power units supplying power to the input shafts 12 would first be throttled back and suitable brake means (not shown) would be provided for either the transmission input or output shafts for quickly stopping the output shaft 14 in preparation for and to facilitate such shifting. For example, the brakes 56 and 58 could also be used for this braking effort as well as for locking either the sun gear 44 or the sun gear 46 against rotation. Also to permit the output shaft to be stopped independently of the power units connected to the input shafts 12, suitable clutch means (not shown) preferably would be provided to de-clutch said power units during the shifting operation from forward to reverse or vice versa.

A particular form of free-floating, planetary transmission having axially-spaced input, output and reaction planet gears has been illustrated. It is evident from the aforementioned Chillson patent that changes could be made in the transmission illustrated without departing from the invention. For example, in FIG. 1 of the aforementioned Chillson patent, in lieu of the annular input gear 40, a sun gear could be used to provide the input to the planet gears 26. In such case, as in the Chillson patent, annular gears surrounding the planet gear 28 and 30 would, of course, be substituted for the sun gears 44 and 46. Also, obviously other forms of clutches and/or brakes could be substituted for those illustrated.

It is clear, therefore, that this invention is not limited to the specific details of construction herein illustrated and that changes and modifications may occur to one skilled in the art without departing from the spirit or scope of the invention.

What is claimed is:

1. A transmission comprising:
   (a) a set of free-floating planetary elements spaced circumferentially about the transmission axis with each planetary element having a spindle disposed parallel to said axis;
   (b) a plurality of axially-spaced rings co-axial with the transmission axis and having rolling contact with said planetary elements to constrain said elements against the radial forces acting thereon;
   (c) each spindle having first, second and third planet gears mounted on the spindle and axially spaced therealong;
   (d) a first toothed wheel co-axial with the transmission axis and meshing with said first planet gears of said planetary elements and providing the transmission input;
   (e) a plurality of input gears each of which is connected via a driveshaft to a source of rotary power for rotation in a single direction and disposed in mesh with said first toothed wheel to rotate said first toothed wheel;
   (f) a second toothed wheel co-axial with the transmission axis and meshing with said second planet gears of said planetary elements;
   (g) a third toothed wheel co-axial with the transmission axis and meshing with said third planet gears of said planetary elements;
   (h) an output shaft;
   (i) clutch means selectively operable to connect one or the other of said second and third toothed wheels to said output shaft;
   (j) brake means selectively operable to prevent rotation of that one of said second and third toothed wheels not connected to said output shaft thereby providing the reaction force on each planetary element for providing rotation of said output shaft alternately in opposite directions; and
   (k) the three planet gears of each planetary element being so spaced apart axially along their spindle that the net turning moment exerted by the input, output and reaction forces tending to tilt each planetary element out of its radial plane, including the transmission axis, is substantially zero.

2. A transmission as claimed in claim 6 in which said second and third planet gears of each planetary element are of different size whereby the transmission output torque is greater for one direction of output rotation than for the other direction.

3. A transmission as claimed in claim 6 in which the three planet gears of each planetary element are so spaced axially along their spindle that the centers of their teeth meshing with said first, second and third toothed wheels lie substantially on a straight line passing through the axis of said element.

4. A transmission as claimed in claim 6 in which said first toothed wheel is an annular gear surrounding the first planet gears of each planetary element and having internal teeth disposed in mesh with said first planet gears.

5. A transmission as claimed in claim 4 in which said second and third toothed wheels are sun gears disposed in mesh with the second and third planet gears of each planetary element.

* * * * *